Aug. 7, 1934.     J. M. ODELL     1,969,414
TURNSTILE
Filed June 15, 1933

Inventor
Jerry M. Odell.

By Raymond Jones.
Attorney

Patented Aug. 7, 1934

1,969,414

UNITED STATES PATENT OFFICE 1,969,414

TURNSTILE

Jerry M. Odell, Marshall, Mo.

Application June 15, 1933, Serial No. 675,981

5 Claims. (Cl. 39—3)

My invention relates to a turnstile, and more particularly to a novel means for supporting a turnstile in a manner to permit continuous rotation thereof selectively in one direction or the other while preventing rotation in the opposite direction.

The main object of my invention is to provide a turnstile bearing that permits a quicker and more positive locking against reverse rotation.

Another object is to provide a turnstile bearing comprising parts that may be assembled in either of two positions to permit either clockwise or counter-clockwise rotation.

A further object is to provide a turnstile that comprises a minimum of parts and which is easy to assemble, economical to construct, as well as being rugged, durable and noiseless in operation.

In the accompanying drawing wherein is illustrated a preferred form of the invention, Figure 1 shows a side elevation of an assembled turnstile;

Figure 2:
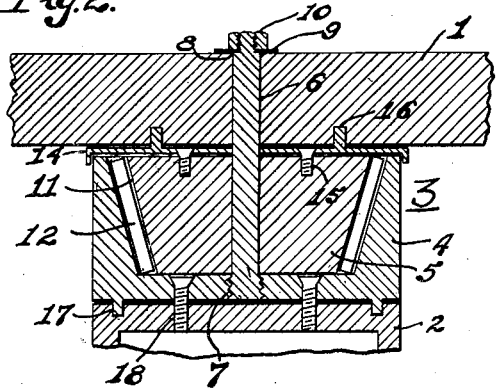
Fig. 2 is a part sectional view on line 2—2 of Fig. 1.

Referring to the drawing in detail, a common form of rotary gate 1 is mounted on a pedestal 2, by means of a bearing section 3. The present invention concerns the bearing which is composed of an outer and stationary casing 4 secured to the pedestal 2, and an inner rotatable member 5 which is secured to the rotary gate 1. These parts are maintained in a unitary assembled position by means of a rod 6 which is threaded at its lower end at 7 to engage a central threaded opening in the lower wall of the casing 4. The rod 6 extends through openings bored centrally through the conical bearing 5 and the gate 1 in a manner to permit the gate and its connected bearing 5 to rotate freely on the rod 6. This rod 6 may be reduced in diameter at its upper end to form a shoulder 8 which supports a washer 9. The upper end of the rod 6 is threaded to receive a nut 10 which functions to restrain the gate 1 and bearing 5 from moving upwardly.

The inner wall of casing 4 and peripheral face of bearing 5 are cut on a taper of about 17 degrees. A plurality of roller bearing slots 11, preferably an even number as 4 as shown, or more, are formed in the peripheral face of the bearing 5. Each slot is formed at one side thereof in shape to loosely retain a roller 12 and the bottom of each slot is curved at 13 in the manner of a cam to force a related roller 12 outwardly against the inner wall of casing 4 when that curved portion serves to push its related roller in one direction.

Figure 3:
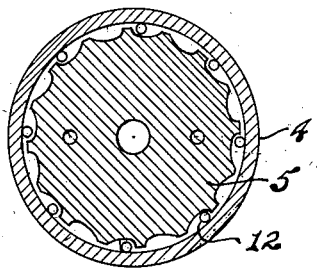
Fig. 3 shows a section on line 3—3 of Fig. 1.
Figure 1:
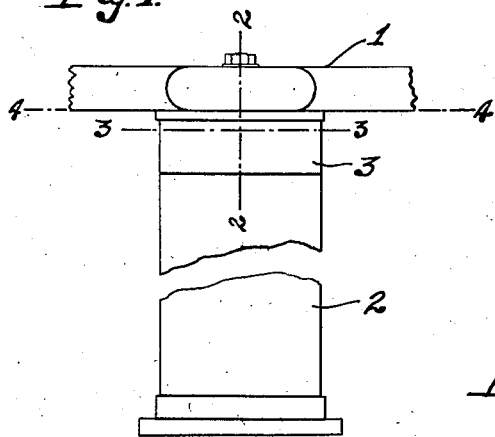

It will be noted that alternate slots 11 are curved reversely and that only 8 rollers are shown in Fig. 3 as positioned in alternate ones of the 12 slots and for a purpose to be described. A dust cover 14 is secured as by screws 15 to the conical bearing 5 and this cover carries integral upwardly projecting pins or lugs 16 that engage correspondingly shaped openings formed in the underside of the bars of gate 1 whereby rotation of this gate will cause bearing 5 to rotate. A plurality of integral pins 17 formed on the underside of casing 4 are adapted to engage correspondingly shaped openings in the top of the pedestal 2 to assist in preventing rotation of the casing 4 thereon. Additional securing means such as screws 18 may be used to secure casing 4 and pedestal 2 together. If desired, the rollers 12 may be tapered.

As shown in Fig. 3, rotation of the gate 1 and bearing 5 looking downwardly thereat will be permitted in a clockwise direction, but a reverse movement of the bearing 5 will cause the curved cam faces 13 to force their coacting rollers outwardly against the inner wall of the casing 4, thereby to lock the members 4 and 5 against relative rotation. If it is desired to permit operation of gate 1 in a counter-clockwise direction, the unit is dissembled and the 4 rollers shown are placed within the other empty alternate slots which are curved in a reverse manner to cause locking of gate 1 when it is pushed for clockwise rotation.

It will be noted that the rollers 12 lean outwardly at about 17 degrees, which causes these rollers to bear mainly on the inner face of casing 4. Such construction causes a drag of these rollers on that face which will cause these rollers to be moved more readily to either of their extreme positions. This produces a more positive and quicker locking action by all rollers used. Such quick and positive locking action acts to materially reduce the noise ordinarily inherent in turnstiles now in use. Still further reduction in noise is obtained because all rollers are overbalanced outwardly at all times, and this arrangement prevents any objectionable chattering of rollers such as would be inherent in such devices if the rollers were positioned vertically. In prior art devices of this nature it has been customary to use light springs to force the locking devices into locking position. In my improved turnstile, such springs may be eliminated and, at the same time, an efficient and positive locking is obtained. It will be noted that the dust cover 14 as shown performs the double function of sealing against entry of dust to the rollers and interlocking the gate 1 to bearing 5 by means of the pins 16.

Figure 5:
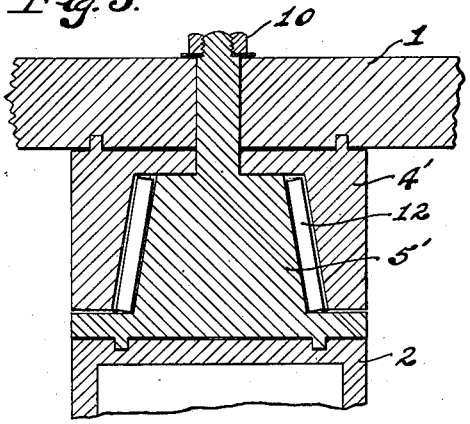
Fig. 5 shows a modification.

In the modification shown in Fig. 5, an outer cylindrical casing 4' is open at its lower end and the gate 1 is secured to its upper closed end. The inner tapering member 5' is secured to the pedestal 2. The rollers 12 may be positioned in slots formed on the inner face of casing 4' to contact the outer face of member 5'. In this form of the invention, it is not necessary to provide a dust cover or dust seal of any nature, thereby reducing parts to a minimum.

Figure 6:
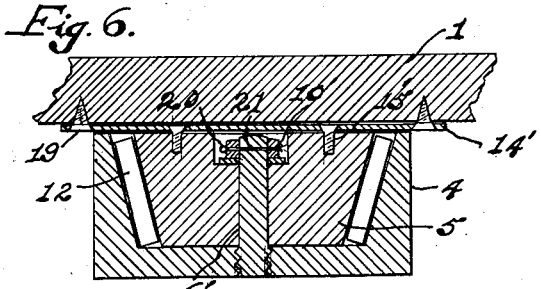
Fig. 6 shows a modified dust cover.
Figure 4:
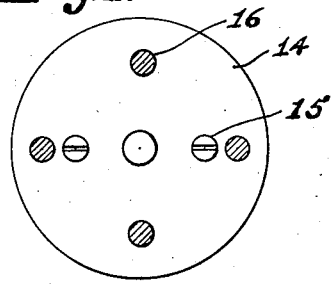
Fig. 4 shows a section on line 4—4 of Fig. 1.

In Fig. 6, a modified dust cover 14' is shown as attached to the gate 1 by means of screws 19 and to the conical member 5 by screws 15'. The member 5 is recessed at 20 to receive a nut 10' which threads onto the bolt 6'. A cotter pin 21 permits adjustment of nut 10' to a position that allows member 5 to turn freely on bolt 6'.

While I have shown and described a preferred form of my invention and specific related details, it is to be understood that various modifications and equivalents thereof are contemplated within the scope of the appended claims.

What I claim is:—

1. In a turnstile, a pedestal, a rotary gate, a bearing comprising coaxial inner and outer members, means to secure one member to said pedestal, means to secure the other member to said rotary gate, one of said members having a circular peripheral face, a plurality of slots formed in said face, the wall of each slot being formed to provide a cam shaped locking face, the locking faces of adjacent slots being curved oppositely and symmetrical to the median plane between adjacent slots, and a plurality of locking rollers adapted to be positioned in alternate ones of said slots in position to engage the adjacent wall of said other member.

2. In a turnstile, a pedestal, a rotary gate, a bearing comprising coaxial inner and outer members, means to secure one member to said pedestal, means to secure the other member to said rotary gate, one of said members having a circular peripheral face, a plurality of slots formed in said face, a plurality of locking rollers positioned in alternate slots in contact with a peripheral wall of the other member, the wall of each slot being formed to provide a cam portion for forcing a related roller against said peripheral wall, the cam portions of adjacent slots being reversely curved, said rollers adapted to be selectively positioned in slots having similar curvature to provide either clockwise or counter-clockwise locking of said gate.

3. In a turnstile, a pedestal, a rotary gate, a bearing comprising circular coaxial inner and outer, relatively rotatable members, means to secure one member to said pedestal, means to secure the other member to said rotary gate, the adjacent wall faces of said members being inclined at an angle to the axis of said members, the face of one member being provided with slots to receive locking rollers, a plurality of locking rollers in said slots in position to contact the adjacent face of said other member, said slots being formed to provide cam portions adapted to force said rollers towards said last named face.

4. In a device as set forth in claim 3, a dust cover positioned between the rotary gate and the member to which it is secured, said cover being extended to overlie said other member.

5. In a device as set forth in claim 3, a rod secured to one of said members axially thereof, the other member having an opening centrally thereof, said gate being provided with a central opening, said rod extending through both of said openings, and means to retain said other member and gate in position on said rod.

JERRY M. ODELL.